US005310482A

United States Patent [19]

Sather

[11] Patent Number: 5,310,482

[45] Date of Patent: May 10, 1994

[54] PULP DRYER SCREEN ASSEMBLY AND METHOD FOR TIGHTENING THE SCREEN THEREOF

[76] Inventor: Stanley H. Sather, 1141 Madore Avenue, Coquitlam, British Columbia, Canada, V3K 3C1

[21] Appl. No.: 642,833

[22] Filed: Jan. 18, 1991

Related U.S. Application Data

[63] Continuation-in-part of Ser. No. 428,942, Oct. 30, 1989, abandoned.

[30] Foreign Application Priority Data

Sep. 29, 1989 [CA] Canada .................................. 615315

[51] Int. Cl.[5] ......................... B01D 27/08; B03B 5/06

[52] U.S. Cl. .................................... 210/485; 210/495; 210/499; 209/408; 162/100

[58] Field of Search ............................ 34/58; 162/100; 209/238, 403, 405, 408, 409; 210/485, 495, 499

[56] References Cited

U.S. PATENT DOCUMENTS 1,788,296 1/1931 Herndon ............................ 160/379
2,840,161 6/1958 Alexander .......................... 160/377
2,864,500 12/1958 Miller ................................ 209/408
2,963,052 12/1960 Cook ................................. 209/403
3,126,332 3/1964 Salete ................................ 209/408
3,243,042 3/1966 Moulton ............................. 209/403
3,269,029 8/1966 Moss et al. ...................... 209/238 X
3,352,418 11/1967 Swallow ........................... 209/403
4,443,332 4/1984 Nevers ........................... 209/238 X

*Primary Examiner*—Charles Hart
*Attorney, Agent, or Firm*—Shlesinger Arkwright & Garvey

[57] ABSTRACT

A pulp dryer screen assembly includes a rectangular screen, a rectangular frame having four interconnected, elongated frame members and four support members, each support member being adjacent a frame member and aligned therewith. The screen has a taut inner portion and surrounding edge portions clamped between the frame members and adjacent support members. The inner portion of the screen has a pulp fiber collecting surface which has an upstream side with respect to air flow and extends along a plane. The frame and support members are entirely on a downstream side of the plane opposite the upstream side. Preferably the frame members are square tubes, and the support members have orthogonal Z-sections for small screens, and at least two orthogonal W-sections for large screens. The screen is tightened within the frame by drawing opposite support members away from each other to clamp edge portions of the screen between the support members and the frame. The support members are then connected to the frame.

30 Claims, 8 Drawing Sheets

PULP DRYER SCREEN ASSEMBLY AND METHOD FOR TIGHTENING THE SCREEN THEREOF

CROSS REFERENCES TO RELATED APPLICATIONS

This is a continuation in part of my co-pending application Ser. No. 07/428,942 filed 30 Oct. 1989 now abandoned.

BACKGROUND OF THE INVENTION

The invention relates to a pulp dryer screen assembly and a method for tightly mounting the screen on a frame.

Wood pulp is conventionally produced in a continuous web which is subsequently dried in a pulp dryer. In one type of dryer the web or pulp sheet is carried through the dryer between hot air streams which are discharged from blow boxes above and below the web. The air blown onto the web is heated, typically by steam heating coils having finned surfaces. The air picks up wood pulp fibers in the process which would tend to accumulate on the finned surfaces thereby appreciably reducing their efficiency.

For this reason, filtering screens are conventionally placed over the face of steam heating coils to collect the fibers and avoid clogging the coils. A large number of screens is required, and sometimes several hundred screens can be required for a dryer. The most common type of screen is rectangular and is placed over a rectangular perimeter frame. One type of conventional screen assembly employs a perimeter frame of square tubing. The screen is fitted over two sides of the frame and at both the ends. An angle section clamps the screen against the sides and the ends of the screen. Rivets or screws are typically used to secure the angle section to the frame itself. It may be appreciated that a pronounced inner edge occurs about the frame where the angle section fits over the flat surface of the screen.

Eventually such screens become clogged with fibers from the pulp which are desirably removed to improve efficiency of the dryer. This is usually done by vacuuming the screens at least daily. A heavy-duty vacuum cleaner is employed and the nozzle of the cleaner is brushed over the screens to remove the fibers. During this vacuuming operation, the nozzle of the vacuum cleaner brushes over the pronounced inner edge of the angle sections which overlie the screens. This often causes the nozzle to snag the angle sections, sometimes unseating the screens when the operator attempts to unsnag the nozzle from the screens. The screens sometimes fall off the hot coils and have to be retrieved and rehung. Often the screens are not retrieved and rehung while the dryer is in operation due to the undesirability of exposing persons to the very hot atmosphere in the dryer (e.g. 212° F. or 100° c. at the access door). Thus the screens may remain off of the coils for days or weeks until the dryer is cooled during breaks in production.

Repeated snagging can often bend the angle sections, thus increasing the likelihood of snagging again in future. Furthermore, abrasion between the nozzle and the screens sharpens the nozzle which catches the angle sections, leading to damage to the screens during the vacuuming operation. Broken areas of the screens around the frame lead to corresponding areas on the coils which accumulate pulp fibers. The wear and tear on screens due to the cleaning operation and dislodging of the screens to loosen on their frames.

The screens are conventionally provided with crossbars extending between frame members to support the frame members against deflection due to screen tension. The cross bars are conventionally straight and rest close to the backs of the screens. The tension in the screens often decreases rapidly and the resulting slackened screen can bend over the crossbars and frame members. This slackness also leads to additional screen wear and breakage of the screens adjacent the crossbars and frame edges during the vacuuming operation. Eventually, many of the frames become twisted and do not seal against the mounting frames provided adjacent to the coils. A poor seal permits wood fibres to pass edges of the screens and this also causes the fins of the coils to become clogged with wood fibers.

A pulp drier is the only machine in a pulp mill that has to be continuously cleaned during operation of the mill, to enable the mill to continue to operate. The work has to be done manually in high heat and high humidity conditions. It is important that the screens can be quickly cleaned, because the operators are subjected to heat fatigue, and are required to have rest periods between relatively short work periods.

Therefore, there is a significant demand for a screen which is easier to vacuum and which remains taut during the cleaning operation. It would also be desirable to produce a frame which is rigid enough and holds the screen taut. Loose screens are more difficult to clean because fine fibres tend to tangle between loose weaves of the screen, which increases the time required to clean the screen. Furthermore, a simple means of securing the screen to adjacent framework is desirable, so as to reduce the risk of the screen falling off the supports during cleaning.

SUMMARY OF THE INVENTION

The invention provides a pulp dryer screen assembly including a rectangular screen and a rectangular frame having four interconnected, elongated frame members. There are four support members, each support member being adjacent a frame member and aligned therewith. The screen has a taut inner portion and surrounding edge portions clamped between the frame members and adjacent support members. The inner portion of the screen has a pulp fiber collecting surface which is on an upstream side of the screen with respect to air flow through the screen and extends along a plane. The frame and support members are entirely on an opposite downstream side of the screen. In one embodiment the frame members are rectangular section tubes and the support members are Z-sections. In an alternative embodiment, two of the support members are W-section members, and the invention further includes means for biasing opposite support members away from each other towards the frame members aligned therewith. The means include at least one resilient cross member biased between the opposite support members and spaced apart from the screen on the downstream side of the screen.

The invention also provides a method of tightly mounting a pulp dryer screen within a rectangular frame. The screen is placed inside the frame so edge portions of the screen overlie the frame. Support members are placed within the frame over the edge portions of the screen adjacent each side of the frame. The support members on opposite sides of the frame are drawn away from each other so the inner part of the screen is drawn taut and the edge portions are clamped between the support members and the frame. The support members are then connected to the frame.

Compared with the prior art, the invention provides a screen assembly where the frame is flush with the pulp fibre collecting surface of the screen instead of having a protruding or pronounced edge on the angle section of the side of the screen to be vacuumed as described above. Therefore, there is no tendency for the nozzle of a vacuum cleaner to be caught by the frame during the cleaning operation. Furthermore, the screen is securely held in a taut manner within the frame by providing a resilient biasing means which can move opposite frame members further apart if the screen becomes slack. Sagging of the screen is effectively eliminated which decreases damage to the screen during vacuuming and improves the removal of fiber.

DESCRIPTION OF THE PREFERRED EMBODIMENTS

Figure 1:
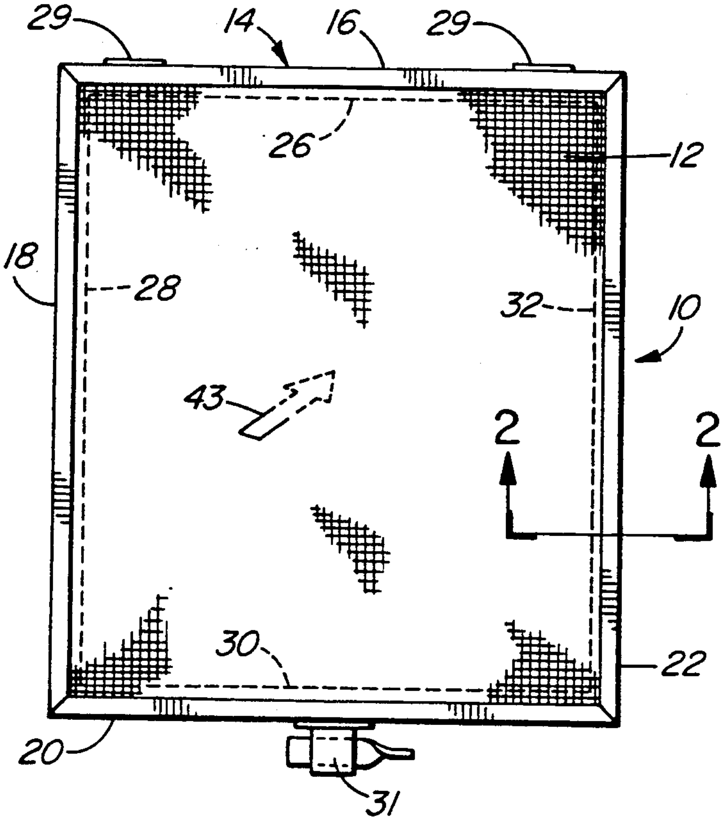
FIG. 1 is a front elevation of a pulp dryer screen assembly according to a first embodiment of the invention, the screen being shown in fragment.
Figure 2:
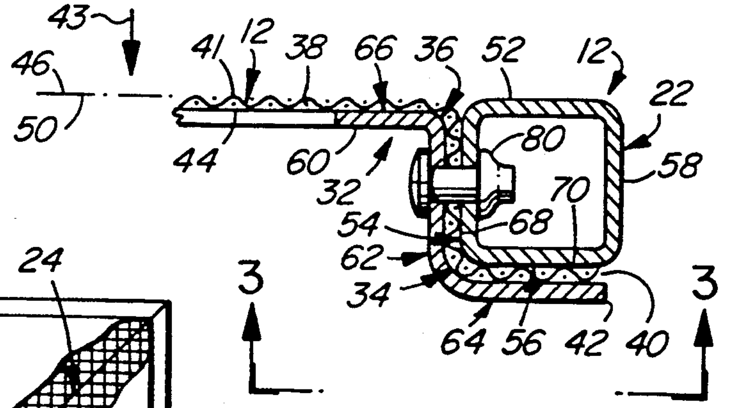
FIG. 2 is a sectional view along line 2—2 of 25 FIG. 1.
Figure 3:
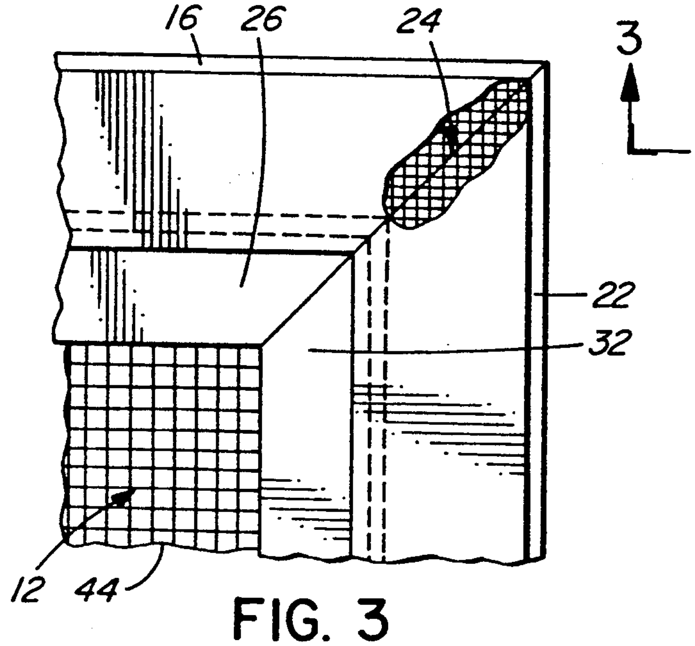
FIG. 3 is an enlarged fragmentary view of one corner of the screen assembly of FIG. 1 viewed along line 3—3 of FIG. 2.

FIGS. 1 through 3 - Small Screen Assemblies

FIG. 1 shows a pulp dryer screen assembly shown generally at 10. The assembly includes a rectangular screen 12, the terms "rectangle" and "rectangular" as used herein also including a square. The assembly also includes a rectangular frame 14 having four interconnected elongated frame members 16, 18, 20 and 22. Each of the frame members is straight and, in this example, is a length of square section tubing as seen best in FIG. 2. The lengths of tubing are mitered at the ends and connected together by welding, for example, at connection 24 between members 22 and 32, as shown in FIG. 3. Alternatively, the corners could be butted instead of mitered. The screen assembly 10 has a length typically of between 32 inches (80 centimeters) and 43 inches (110 centimeters), and a width of between 27 inches (70 centimeters) and 36 inches (90 centimeters). The frame members have a resilience which is sufficient to maintain tension of the screen.

The assembly also includes four support members 26, 28, 30 and 32 shown by the broken lines in FIG. 1. Each of these members is an orthogonal Z-section as seen best for support member 32 in the sectional view of FIG. 2. The support members 26, 28, 30 and 32 are adjacent frame members 16, 18, 20 and 22 respectively, each support member being aligned with the adjacent frame member. The screen assembly includes two spaced known hooks 29 adjacent an upper end thereof, and a novel latching assembly 31 adjacent a lower end thereof. The hooks and assembly 31 cooperate with a steam heating coil frame as will be described in FIGS. 11 through 13.

The screen 12 has an edge portion along each of its four edges, each edge portion being clamped between the respective frame member and adjacent support member so as to maintain tension within the screen. In FIG. 2, the edge portion 34 is that portion of the screen which extends from a location 36 adjacent a pulp fibre collecting surface 38 of the screen to a location 40 adjacent an outer edge 42 of the support member 32. The pulp fibre collecting surface 38 is, of course, on an upstream side 41 of the screen with respect to direction of air flow through the screen, which is shown as an arrow 43. The location 36, and similar locations on the other sides of the frame, is a straight line which defines an outer margin or boundary of an inner portion 44 of the screen. The inner portion 44 is flat and parallel to a plane 46 such that the pulp fibre collecting surface 38 extends along the plane, facing against the air flow direction arrow 43 on a first side of the said plane. It can be seen that the frame members and support members are entirely on a second side 50 of the plane, which side is opposite to the side of the collecting surface 38 and clearly is on a downstream side of the screen with respect to air flow through the screen.

Referring to FIG. 2, each of the frame members has four flat sides, e.g. the member 22 having flat sides 52, 54, 56 and 58. Each of the support members e.g. the member 32, has a first flange 60, a web 62, and a second flange 64. The two flanges are parallel and extend at right angles from opposite edges of the web. Each support member has a first flat surface 66, a second flat surface 68 and a third flat surface 70 on the first flange, web and second flange respectively. The surface 66 contacts the screen 12 on the downstream side opposite to the pulp fiber collecting surface 38 and extends inwardly from the frame, that is towards the center of the screen. The surface 68 of the support member opposes the adjacent flat side 54 of the frame member with the screen being clamped therebetween. In addition, in this embodiment the screen is also clamped between surface 70 of the support member and side 56 of the frame member. The surfaces 68 and side 54 of the support member and frame member respectively are perpendicular to the plane 46 along the surface 38 and extend in a downstream direction indicated by arrow 43.

In this embodiment, it may be observed that outer side 52 of the frame member is flush with pulp fiber collecting surface 38 extending along the plane 46. The support members are located inwardly with respect to the frame, that is towards the center portion of the screen.

The assembly includes means for clamping the edge portions of the screen, such as edge portion 34 of FIG. 2, between the frame and the support members. In this embodiment, the means is a plurality of rivets which are spaced-apart about the frame, one such rivet 80 being shown in FIG. 2. The rivets extend through corresponding aligned apertures in the support member and the frame member and through apertures formed in the screen itself. Thus the screen is tightly received between the two adjacent surfaces on each side of the frame and the adjacent support member.

Figure 4:
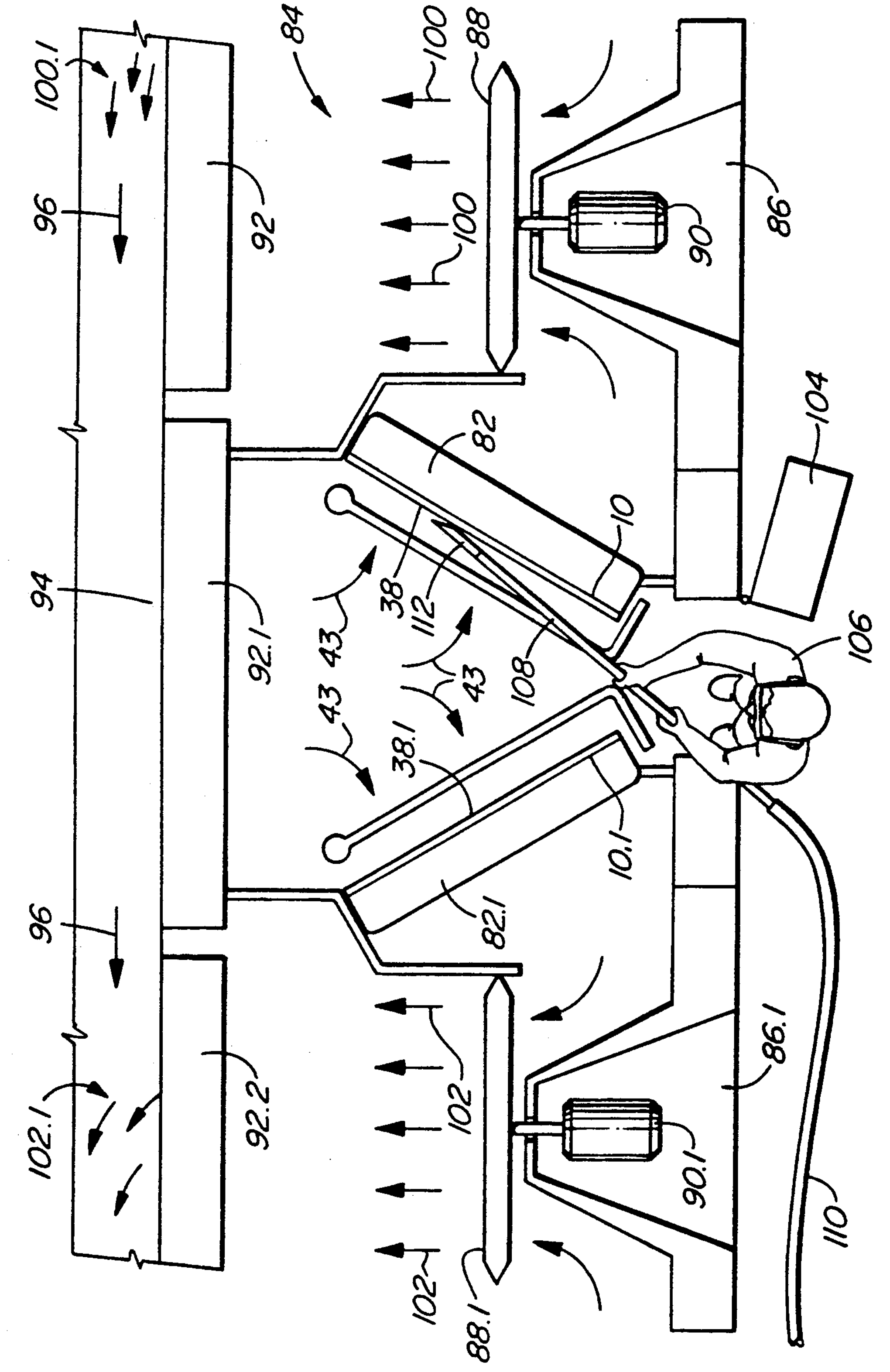
FIG. 4 is a partly diagramatic, simplified top plan of a portion of a pulp dryer showing the screen assembly of FIG. 1 mounted on steam coils thereof.

FIG. 4 - Screen Assembly and Pulp Dryer Combination

Figure 11:
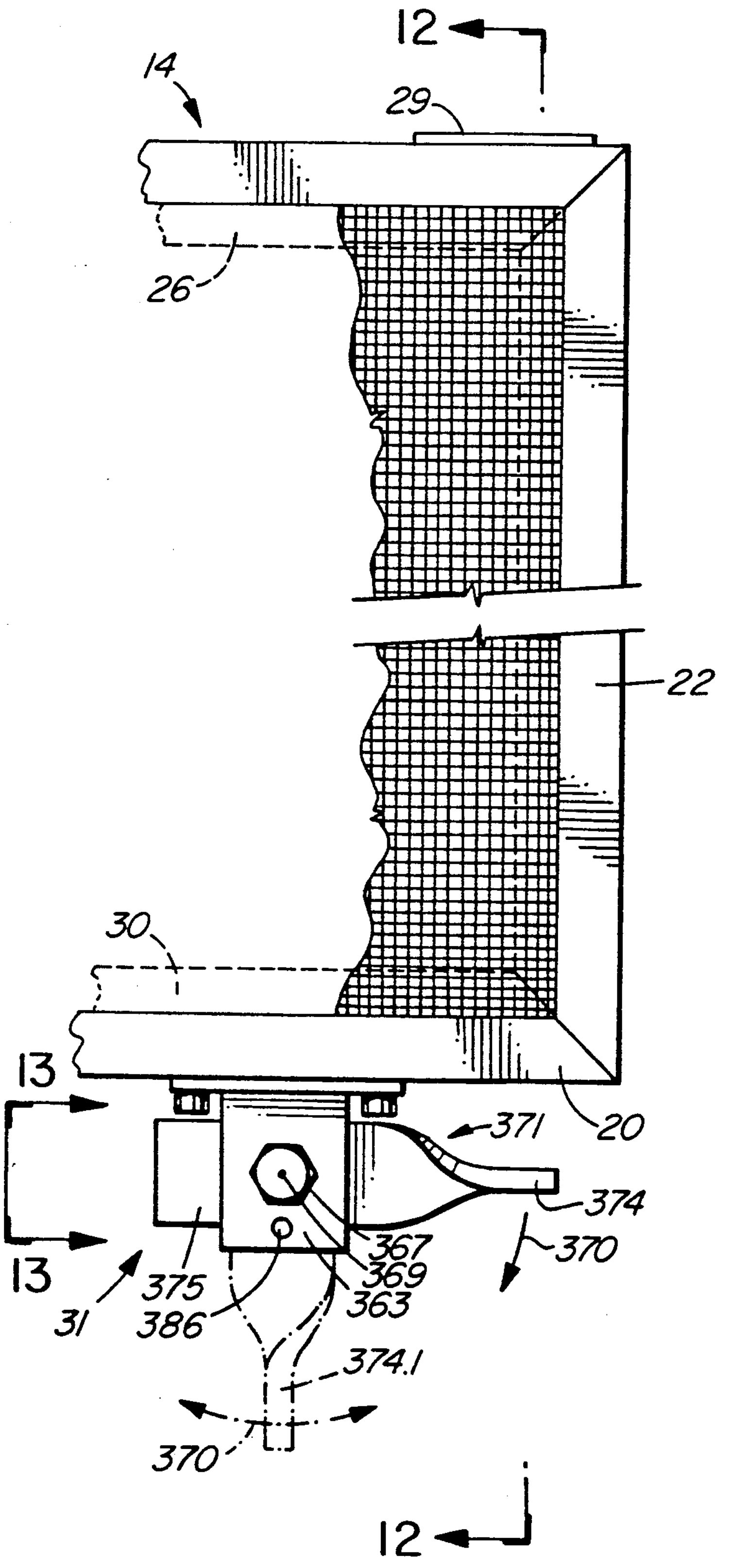
FIG. 11 is a fragmented front elevation of a screen assembly of FIGS. 1 through 3 and a latching assembly for attaching a portion of the screen to a steam heating coil mounting frame, the latch assembly being shown attached to one end of the screen and a portion of the coil mounting frame, the latching assembly being shown in locked and unlocked positions.
Figure 12:
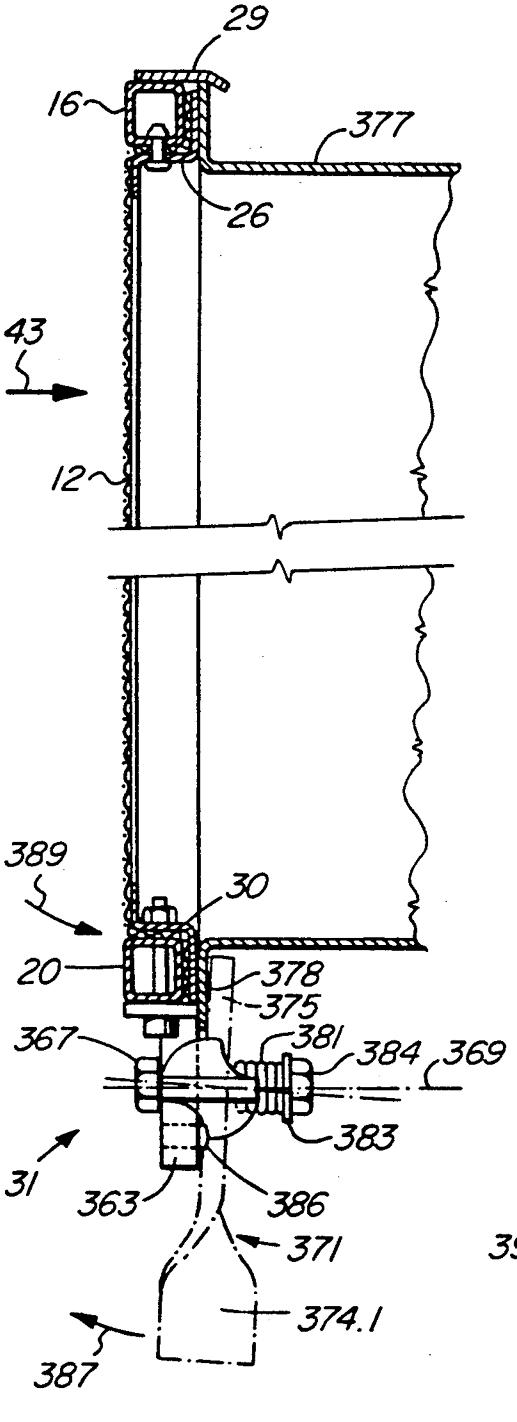
FIG. 12 is a fragmented end elevation of the latching assembly on FIG. 11.

FIG. 4 shows screen assembly 10 positioned on the air inlet side of a steam heating coil 82 of a pulp dryer shown generally at 84. A similar pulp dryer screen assembly 10.1 is shown positioned on another steam heating coil 82.1. The pulp dryer screen assemblies are normally secured to mounting frame members extending about the steam heating coils 211 similar to the frame members 282 and 284, as seen in FIG. 8. The means for securing the assemblies on the coil mounting frames depends upon the particular machine and size of the screen assembly, but inclined pins, similar to those shown in FIGS. 7 and 8, in combination with coil springs etc., or the hooks 29 and the latching assembly 31 as shown in FIGS. 1, 11 and 12 may be connected to the frames for mounting purposes. Alternatively, in very few installations, screen assemblies according to the invention are durable enough to be more "permanently mounted" by providing tapped drill holes in the mounting frames and securing the screen thereto with screws, for example. This "permanent mounting" is not convenient for semi-annual removal of the screens.

The pulp dryer as illustrated has a pair of fan assemblies 86 and 86.1 including fan wheels 88 and 88.1 respectively which are powered by motors 90 and 90.1. The dryer has a plurality of blow boxes 92, 92.1 and 92.2. Pulp web 94 passes over the blow boxes in the direction indicated by arrows 96. The blow boxes have air jets, not shown, under the pulp web in the conventional manner.

Apart from the screen assemblies 10 and 10.1, all other structure in the dryer as shown in FIG. 4 is conventional. Air to be heated is drawn by the fans through the screen assemblies 10 and 10.1 as indicated by the arrows 43. The air passes through the screens of the respective screen assemblies and then through the steam heating coils 82 and 82.1 where the air is heated. The air, shown by arrows 100 and 102, is then forced by the fans into the blow boxes, then out through air jets in blow boxes 92 and 92.2 as indicated by arrows 100.1 and 102.1 respectively.

In this configuration of dryer, each pair of coils has an access door 104 (not shown on assembly 86.1) which can be opened as shown allowing a workman 106 to insert a vacuum wand 108 provided on the end of a vacuum hose 110. The wand has a nozzle 111 which is swept over the pulp fiber collecting surfaces 38 and 38.1 of the respective screens to remove accumulated fibers.

Figure 5:
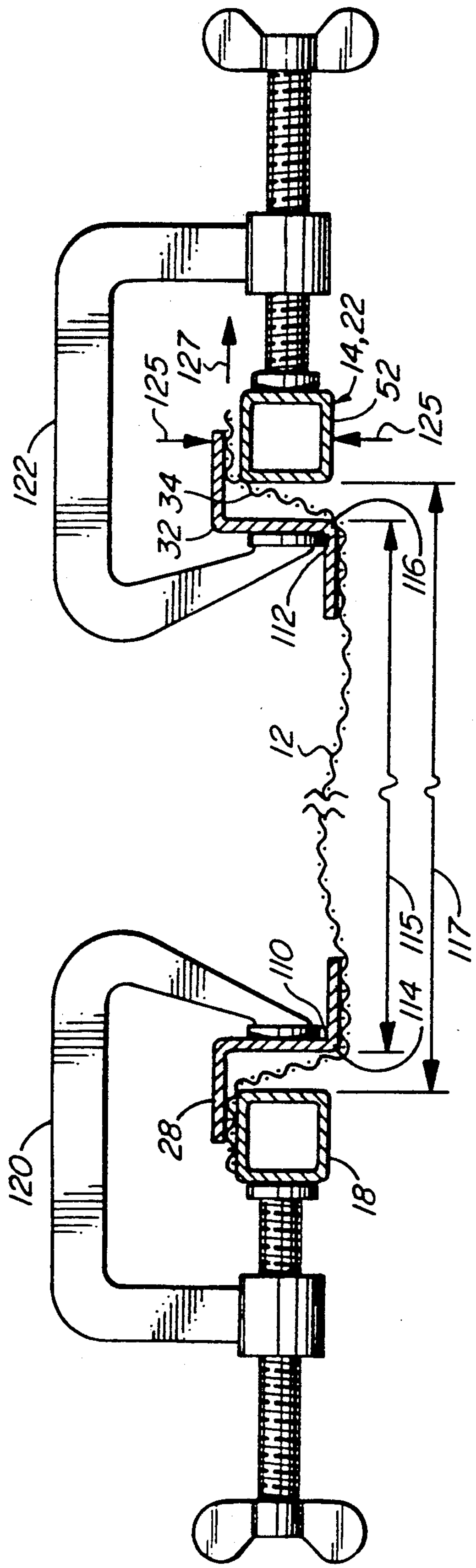
FIG. 5 is a sectional end view of a screen being mounted in a frame to form the assembly of FIG. 1 with the screen being shown in section.
Figure 6:
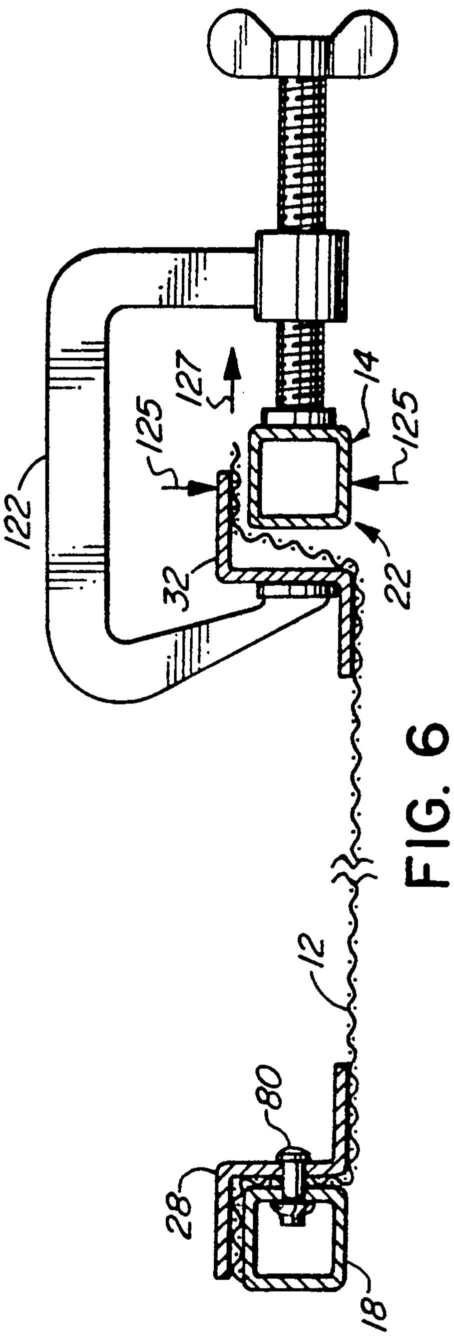
FIG. 6 is a view similar to FIG. 5 after the frame support has been connected to the frame on one side of the assembly and with the screen being drawn taut by the clamp on the other side of the assembly.

FIGS. 5 and 6 - Method of Tightly Mounting Screen on Frame

The invention also provides a method for tightly mounting a pulp dryer screen 12 within the rectangular frame 14.

Firstly, with reference to FIG. 5, a conventional bending brake is used to preform the screen into a dish-shaped configuration in which two oppositely located corners 114 and 116 are formed in the screen, as well as two other oppositely located corners, not shown, to form a rectangular depression in the screen. Distance 115 between the corners 114 and 116 of the screen is less than the distance 117 between corresponding oppositely facing sides of the frame members 18 and 22. The preformed screen is then placed over the frame 14 so the surrounding edge portions of the screen, such as edge portion 34, overlies the frame. The support members 28 and 32 are positioned so the corners 110 and 112 thereof are generally adjacent the corners 114 and 116 formed in the screen.

A plurality of clamps, such as C-clamps 120 and 122, are placed over the support members and the frame. The clamps on one side of the frame are first tightened, for example clamp 120 and also the other clamps on the same side of the frame. This draws support member 28 towards the frame member 18 and clamps the edge portion of the screen between the support member 28 and the frame member 18. Next, the clamps on the opposite side, such as clamp 122, are tightened to draw the support member 32 away from support member 28 and against the frame member 22 of the frame, this position being shown on the right of FIG. 6. In doing so, the inner portion of the screen 12 is drawn taut because, as mentioned with reference to FIG. 5, the distance 115 between the corners 114 and 116 initially formed in the screen is less than the distance 117 between the opposite sides of the frame members 18 and 22. The above description is a simplified description for an "ideal screen" and pertains to two sides of the frame, the operation being repeated for the sides perpendicular thereto. In practice, additional clamps are commonly required to apply a vertical clamping force (as seen in FIGS. 5 and 6) to the support member and adjacent frame member, as shown by opposed aligned arrows 125. Such arrows represent a clamping force which is used to press the second flange of the support member towards the frame member, thus further increasing friction between the edge portion of the screen and the support member and frame member. Also, plier-type grips, not shown, can be used to grip the edge portions of the screen to apply an outwards force in direction of arrow 127, thus assisting in removing any localized areas of slackness in the screen. Sequential loosening and tightening of clamps, and drawing of the screen outwardly in direction of arrow 127 is used to attain a smooth, flat taut inner portion of the screen. Individual clamps around the perimeter of the frame are then finally tightened as required to hold the screen uniformly taut. A plurality of aligned holes are drilled through the support members and adjacent frame members. Hollow, mandrel-expanded, rivets, similar to "Pop rivets" 80 are placed in the drilled holes along the member and frame to secure them together with the screen held tightly therebetween.

Other fastening means could be employed instead of the pop rivets 80. For example, once the clamps are tightened, the support members can be tack welded to the frame. The tack welding is done right through the screen. Plain rivets, screws, spot welds or plug welds could also be used or combinations thereof however, pop rivets are preferred.

ALTERNATIVES

FIGS. 7 through 10 - Large Screen Assemblies

Figure 7:
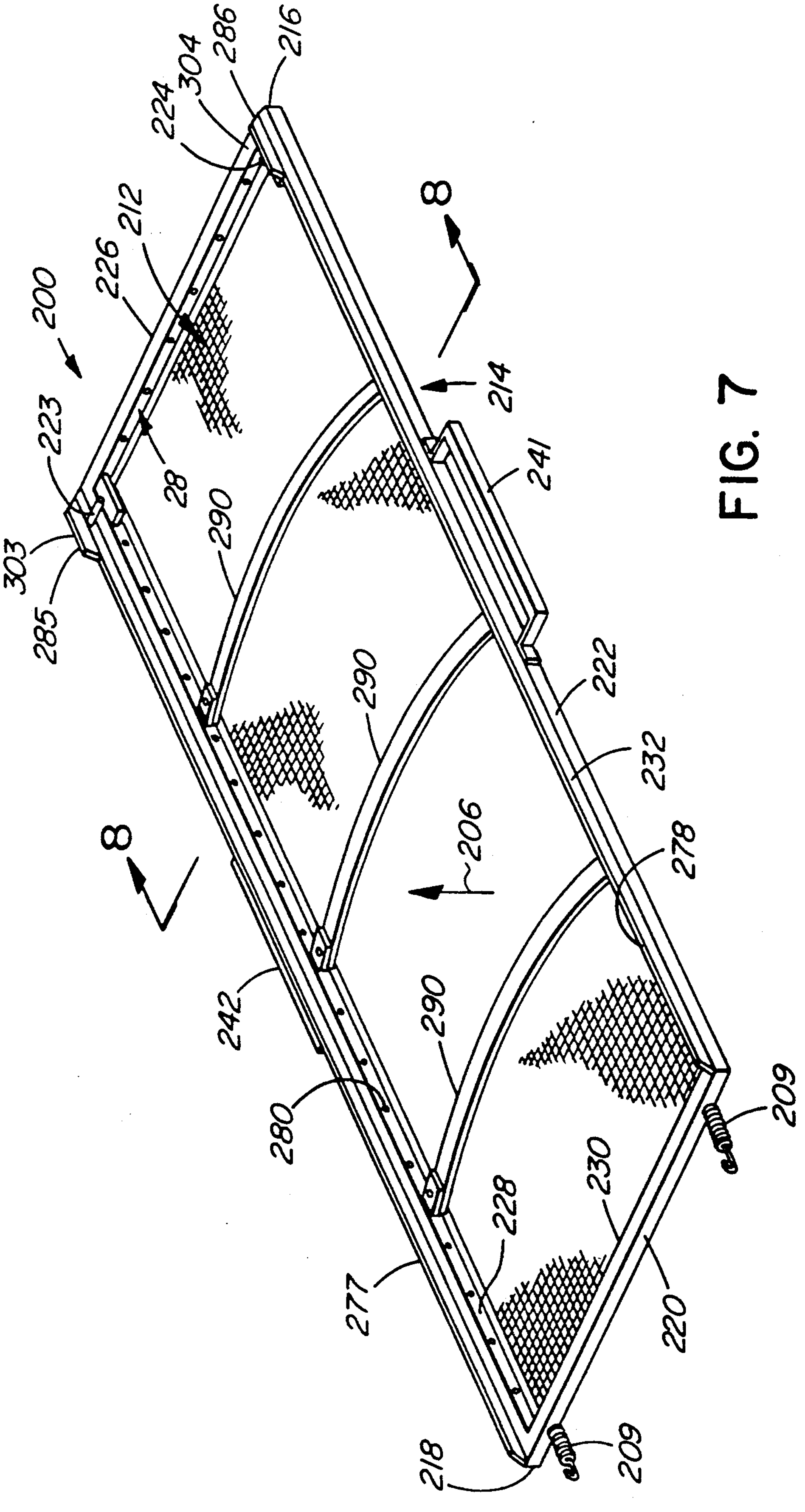
FIG. 7 is an isometric view of a pulp dryer screen assembly according to a second embodiment of the invention.
Figure 8:
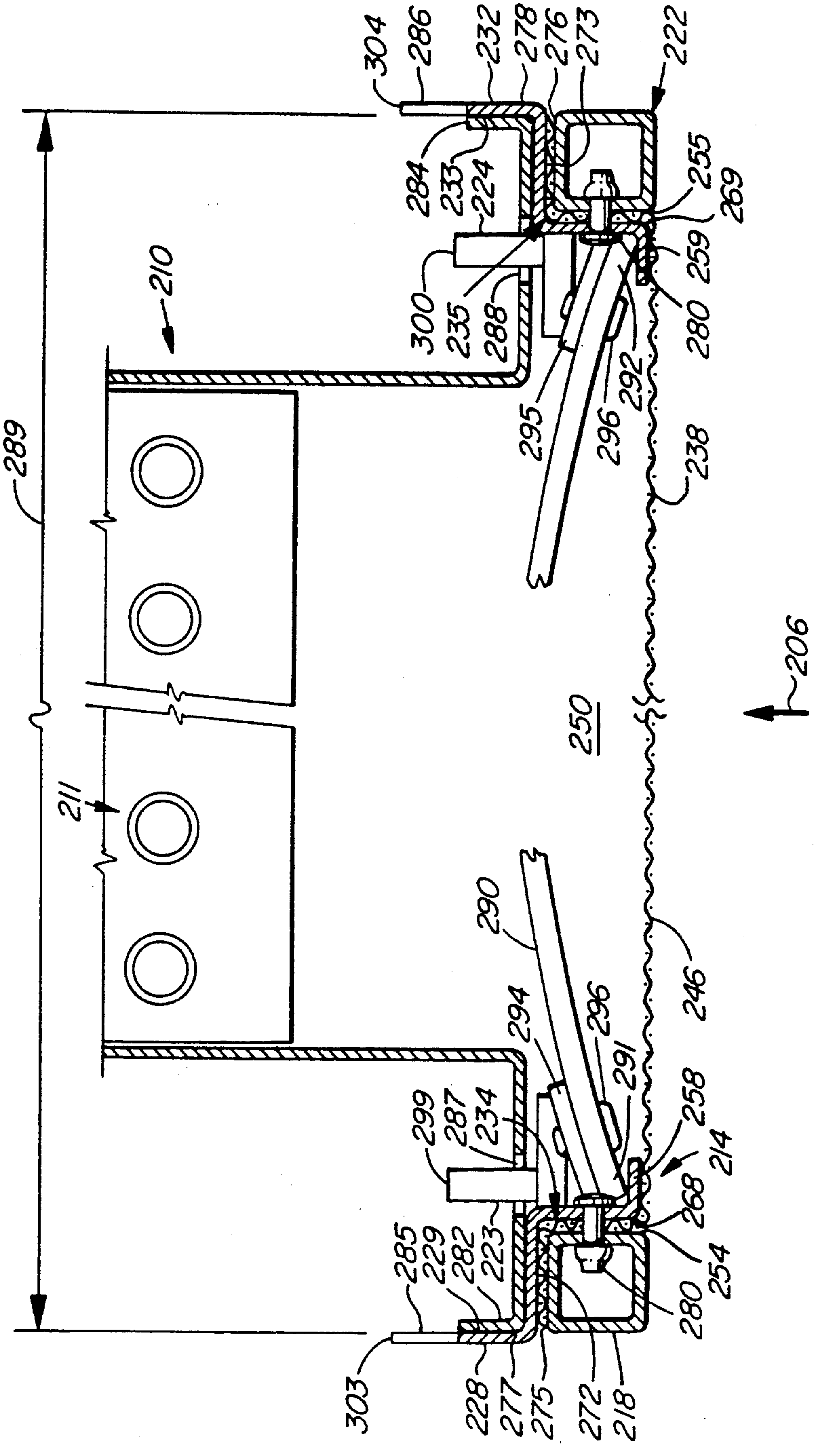
FIG. 8 is a fragmented cross-sectional view of the pulp dryer screen assembly, generally as would be seen on line 8—8 of FIG. 7, shown mounted on a steam heating coil frame.

Referring to FIGS. 7 and 8, a pulp dryer screen assembly according to a second embodiment of the invention is shown generally at 200. The assembly 200 is considerably larger than the assembly 10 of FIGS. 1 through 3, and 11 and 12, and thus requires additional means to stiffen the assembly and to facilitate handling and mounting. The assembly includes a screen 212 and a rectangular frame 214 having four elongated frame members 216, 218, 220 and 222, which are generally rectangular or square sectioned and are similar to those of the first embodiment. The screen extends between the elongated members and has a flat pulp fibre collecting surface 238 on an upstream side of the screen with respect to air flow through the screen, shown as arrow 206, and extending along a plane 246 between the elongated members.

In contrast to the screen assembly 10 of FIGS. 1 through 3, the screen assembly 200 has a length of between 100 inches (250 centimeters) and 120 inches (300 centimeters), and a width of between 27 inches (70 centimeters) and 40 inches (100 centimeters). Thus, the longer side frame members 218 and 222 are several times longer than upper and lower end frame members 216 and 220 of the screen assembly, and thus are subjected to some considerable bending loads from tension in the screen. This alternative provides a simple lightweight structure to resist the bending loads, and to prevent the screen from becoming slack due to deflection of the side members due to these loads.

The screen assembly 200 includes a pair of known support pins 223 and 224 located adjacent an upper portion of the screen assembly, namely extending adjacent the upper frame member 216, to support the screen assembly as will be described. Handles 241 and 242 are secured to the frame members 222 and 218 respectively to facilitate handling of the screen assembly by one man, in contrast to two men normally required. Elongated tension coil springs 209 are connected to the lower frame member 220, i.e. at an end of the frame assembly opposite to the upper frame member 216, to connect a lower portion of the frame member to the coil mounting frame 210 supporting heating coil assembly 211.

Four support members 226, 228, 230 and 232 are adjacent and aligned with respective frame members 216, 218, 220 and 222, and are fastened to the respective frame members by rivets 280 in the embodiment shown, but it will be appreciated that screws or other fastening means which permanently secure the support members to respective frame members may be used. The support members 226 and 230 are located adjacent the ends of the frame and have orthogonal Z cross-section shapes similar to the support members 26–32 of FIG. 2. In contrast, the support members 228 and 232 are relatively long and located at the sides of the frame and have an orthogonal W cross-section shape as will be described.

As previously described, each of the four frame members has a first surface disposed normal to the plane of the pulp fibre collecting surface 238. In FIG. 8, the first surfaces of the longer frame members 218 and 222 are designated 254 and 255 respectively. The longer support members 228 and 232 have respective first surfaces 258 and 259 of first flanges contacting the screen on a side opposite to the pulp fibre collecting surface, namely on the downstream side, and extend inwardly from the frame towards the centre of the screen. Each of the support members has a second surface which is disposed opposite the first surface of the frame member to which it is connected. In FIG. 8, the second surfaces of support members 228 and 232 are designated 268 and 269 respectively.

The screen has edge portions along each of its sides surrounding the inner portion of the screen, the edge portions being sandwiched between the first surfaces of the frame members and the second surfaces of the support members. Edge portion 234 of the screen is shown sandwiched between the first and second surfaces 254 and 268 on the left side of the frame, and an opposite edge portion 235 is shown sandwiched between the first and second surfaces 255 and 269 on the right side of the frame. The method of tightly mounting the screen on the frame described previously is used to ensure the screen is held taut between the frame members.

The longer support members 228 and 232 also have respective third surfaces 272 and 273 on respective second flanges which are disposed oppositely to second surfaces 275 and 276 of the frame members 218 and 222 respectively. The second flanges are parallel to the first flanges and perpendicular to the first webs as previously described. The support members 228 and 232 have second or outer webs 277 and 278 extending perpendicularly to the respective second flanges as shown, and thus provide a strengthening and sealing portion in addition to that shown in the Z-shaped support members of FIGS. 1 through 3. Each of the outer webs of the support members 228 and 232 has a perpendicular surface extending generally perpendicular to the respective first flange, i.e. the plane of the pulp fibre collecting surface 238. In FIG. 8, the perpendicular surfaces of the outer webs 277 and 278 of the support members 228 and 232 are designated 229 and 233. The perpendicular surfaces engage adjacent coil mounting frame members 282 and 284 of the dryer frame 210 to seal the screen assembly on the mounting frame extending about the steam heating coils 279. The outer webs can be seen to extend in a direction on the downstream a side of the screen, that is in the direction 206 of air flow through the screen. Each outer web 277 and 278 has a respective guide portion 285 and 286 extending therefrom, the guide portion being spaced apart at a spacing 289 which is somewhat greater than the transverse spacing between the coil mounting frame members 282 and 284 defining size of the coil heating surface opening.

The support pins 223 and 224 engage openings 287 and 288 in the dryer mounting frame 282 and 284 to support the screen assembly thereon. The pins 223 and 224 extend obliquely from the rectangular frame 214 in a direction away from the screen to outer ends 299 and 300 thereof, as seen for the pin 223 in FIG. 7. Each guide member is located outwardly of the respective adjacent pin. The guide members have outer edges 303 and 304 projecting beyond the outer ends of the pins as shown, so that opposite faces of the guide members engage the coil frame sides before the pins contact the screen and pass into the openings 287 and 288. Thus, when installing the screen onto the coil frame, the guide members embrace the coil frame members initially and assist in guiding the pins to engage the openings in the frame. The guide portions and handles considerably simplify the installation of the large screens so that one man can do a job faster than two men installing similar sized prior art screens.

The screen assembly 200 further includes a plurality of cross-members 290 which are connected between support members on opposite sides of the assembly. Referring to FIG. 8, a representative cross-member 290 having first and second end portions 291 and 292 is formed from a portion of normally straight spring-steel having a length slightly longer than the distance between support members on opposite sides of the assembly.

Figure 9:
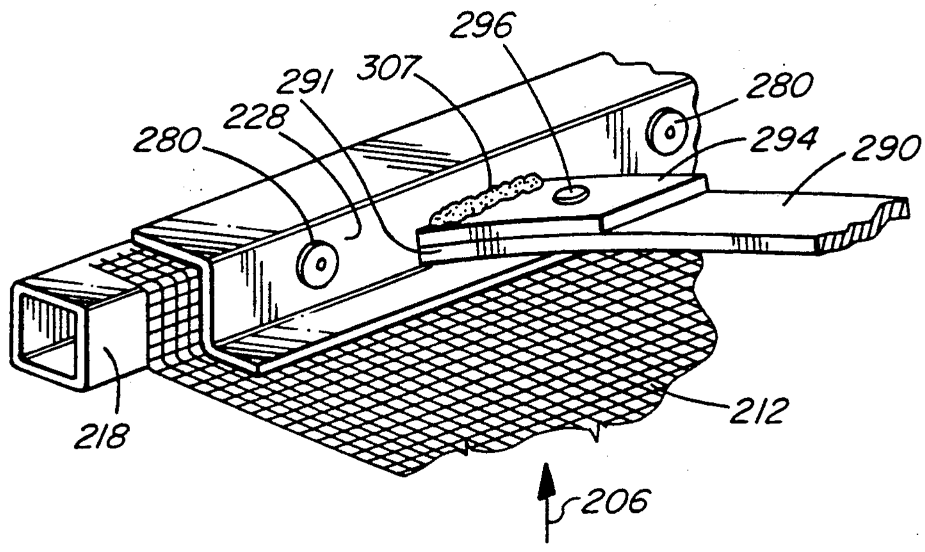
FIG. 9 is a fragmentary view of one cross-member of the assembly of FIG. 7, and means for securing it to the frame assembly.

Referring also to FIG. 9, the end portions of each cross member are initially riveted to respective relatively short end pieces 294 and 295 by rivets 296. The end pieces are relatively thin when compared with the cross-members, have a generally similar width thereto, and are drilled with a clearance opening for the rivet somewhat larger than shank of the rivet to provide some lost motion between the rivet and the end piece. Thus, the end piece can move slightly with respect to the cross-member, to enable an end edge of the cross member to project slightly outwardly of an end edge of an adjacent end piece. To install the cross member 290, it must be bent into a bow-shape to force the first end portion 291 of the cross member against the support member 228 and the second end portion 292 against the support member 232. The lost motion provided between the end pieces 294 and 295 and the corresponding end portions 291 and 292 ensures that end edges of the end portions of the cross-member engage the support member to apply the force to the support member, while the rivet is substantially relieved of any shear loads. The outer end edges of the end pieces 294 and 295 are then welded to the support members 228 and 232 as shown in FIG. 9 without welding the cross member, a typical weld 307 being shown. Because the cross members are spring steel, they cannot be welded without partially destroying the heat treatment, with a risk of cracking the end portions of the cross members. Consequently, the end pieces are used as an intermediary connection to prevent problems of heat affecting the spring material. By positively connecting the cross members to the support members, there is no chance of the cross members unintentionally separating from the frame assemblies. The end pieces are lightly welded to the support members in such a manner that they could be easily separated therefrom by grinding followed by chiselling if it becomes necessary to replace the screen.

The bowing of the cross members creates a spring action which applies a resilient outwards force to the support members 228 and 232 and adjacent frame members 218 and 216. This outwards force stiffens the relatively long frame members against bending excessively inwardly due to tension in the screen and thus maintains the screen under tension. Bowing the cross-members permits them to be made of a relatively light-weight material and serves to maintain the screen taut over a long period of time, and also strengthens the whole screen assembly against deflection to facilitate handling and installation. Furthermore, it will be appreciated that over time, the screen has a slight tendency to stretch. The cross-members bias or force the support members outwardly thereby maintaining the screen taut even after stretching has occurred. It will be appreciated that bow-shaped spring steel cross-members act primarily as a means for biasing the oppositely facing support members and adjacent frame members apart to maintain screen tension, and secondarily as means to stiffen the frame when handling.

It may be observed that the frame 214, support members 226, 228, 230 and 232 and the cross-members 290, are entirely on a downstream side 250 or the plane 246, the side being opposite to an upstream side of the screen in which the pulp fibre collecting surface 238 is facing. Thus, these members do not come in contact with the screen during vacuuming, thereby prolonging the life of the screen.

Figure 10:
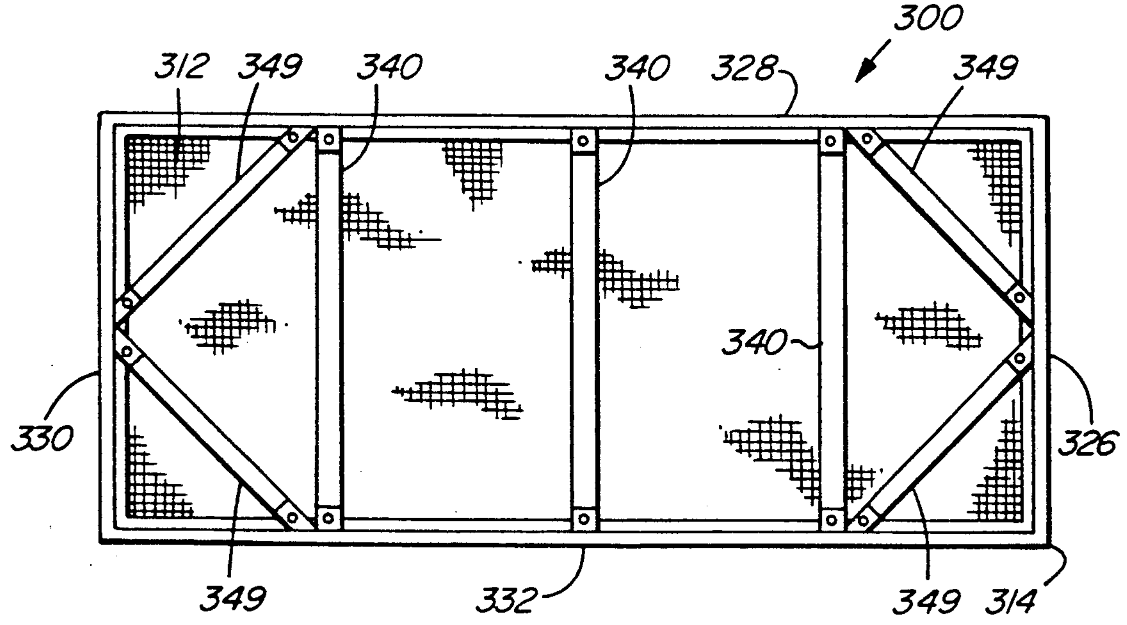
FIG. 10 is a rear plan view of a pulp dryer screen assembly according to a third embodiment of the invention.

Referring to FIG. 10, a third embodiment according to the invention is illustrated generally at 300. This embodiment is similar to the second embodiment in that it includes a similar frame 314, a similar screen 312, similar support members 326, 328, 330 and 332 and similar first cross-members 340. The third embodiment however, includes a plurality of diagonal cross-members 349 biased between adjacent support members at each corner of the screen, such as between the support members 328 and 330. Each of the diagonal cross-members has opposite end portions on which are secured end pieces for welding to adjacent support members as shown in FIG. 9. Each diagonal cross-member is also bow-shaped to space it apart from the screen on the side of the plane opposite the direction in which the pulp fibre collecting surface is facing. It is anticipated that the diagonal cross members will only be required on exceptionally wide and long frame assemblies.

Figure 13:
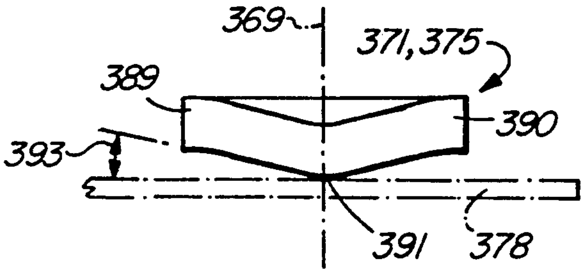
FIG. 13 is a fragmented detail section on Line 13—13 of FIG. 11.

FIGS. 11 through 13 - Latching Assembly

The latching assembly or means 31 has a base member 363 secured to the frame member 20, and a hinge pin 367 extending from the base member to be cocentric with a latch axis 369. A latch arm 371 is hinged to the base member for rotation about the latch axis relative to the base member. The latch arm 371 has inner and outer ends 374 and 375, the ends being generally flat plates within mutually perpendicular planes for ease of manufacturing and actuation. The outer end 375 is adapted to cooperate with a portion 378 of a steam coil frame 377, and the inner end 374 is adapted for gripping by an operator's fingers for swinging in accordance with an arrow 370. The hinge pin can be a conventional bolt and permits the said rotation of the arm 371, and extends generally normally from the base member. An helical coil spring 381 encircles the hinge pin 367, and the pin has a threaded end mounting a washer 383 and nut 384. The washer and nut serve as an end stop for the hinge pin, and the latch arm and the spring are mounted on the pin between the base member and the end stop as shown. A locking projection 386 extends from the base member to engage the arm 371 when the arm is centred in the latched position as shown in broken outline.

The latch arm has an opening (not shown) to receive the hinge pin, the opening being somewhat larger than diameter of the pin to permit limited lateral or "rocking" movement of the latch arm in accordance with an arrow 387. The coil spring 381 tends to force the latch arm 371 flat against the base member, but the limited rocking movement per the arrow 387 and the shape of the outer end 375 facilitate movement of the outer end 375 to pass over the portion 378 of the coil frame as will be described. Also, the spring 381 facilitates engagement and disengagement of the locking projection 386.

As seen in FIG. 13, the outer end 375 has outer edge portions 389 and 390 which are curved upwardly from an intermediate portion 391, lower surfaces of the edge portion defining an angle 393 with respect to a plane normal to the axis 369 and containing the portion 378. The angle 393 provides a lead-in means on the outer end 375 of the latch arm for facilitating engagement of the outer end with the adjacent portion 378 of the dryer mounting frame.

In operation, when an operator is mounting the screen assembly onto the dryer frame, the hooks 29 engage an upper portion of the frame 377 and the latch arm 371 is initially positioned in the full outline position as shown in FIGS. 11 and 12, to permit the arm to pass over the coil frame portion 378 per arrow 389. When the screen assembly is securely located as shown in FIG. 12, the latch arm 371 is rotated through 90 degrees in accordance with the arrow 370, so that the inner end assumes the latched position as shown in broken outline at 374.1. As the operator is rotating the latch arm from the unlatched to latched position, he can draw the inner end 374 towards himself slightly, in accordance with arrow 387 in FIG. 12, thus facilitating passage of the outer end 375 over the portion 378.

The latch assembly 31 as described above is considered to be an advantage over prior art structure for locating lower ends of screen assemblies, because an operator can quickly notice if the screen assembly is hanging obliquely from the dryer, and thus is not securely latched.

While specific embodiments of the invention have been described and illustrated, such embodiments should be considered illustrative of the invention only and not as limiting the scope of the invention as construed in accordance with the accompanying claims. For example, while the bowed cross members 290 are shown with frames having W-section support members of FIGS. 7 and 10, the bowed cross members could be used with frames having Z-section support members of FIGS. 1–3. Similarly, the frames using support members having W-cross section could be used without bowed cross members, if adequate screen tension can be maintained without such cross members. Such permutations are within the scope of the invention.

What is claimed is:

1. A pulp dryer screen assembly comprising:

(a) a rectangular frame having four interconnected elongated frame members;

(b) four support members, each said support member being adjacent one respective frame member and aligned therewith, (c) a rectangular screen having a taut inner portion and surrounding edge portions, the support members contacting the screen to define a boundary between said taut inner portion and said edge portions, said edge portions adjoining said inner portion being clamped between and protected from abrasion by the frame members and respective support members, said inner portion of the screen having a pulp fiber collecting surface on an upstream side of the screen with respect to direction of air flow through the screen and extending along a plane, said support members and frame members being located such that said support members and frame members do not project beyond said pulp fiber collecting surface of said inner portion, so that no pronounced portions of the frame members and support members overlie the edge portions of said pulp fiber collecting surface to facilitate cleaning of the upstream side of the screen.

2. An assembly as claimed in claim 1, wherein each said support member has a first flat surface contacting the screen on a side opposite the pulp fiber collecting surface and extending inwardly from the frame towards the center of the screen.

3. An assembly as claimed in claim 2, wherein each said support member has a flat first flange extending parallel to the screen, the first surface being on one side of the flange.

4. An assembly as claimed in claim 3, wherein:

(a) each frame member has a first surface, (b) each support member has a second surface which opposes said first surface of the adjacent frame member, (c) the edge portions of the screen are clamped between the second surface of the support member and the first surface of the frame member.

5. An assembly as claimed in claim 4, wherein the second surface of each support member and the first surface of each frame member are flat and extend perpendicularly from said plane.

6. An assembly as claimed in claim 5, wherein each support member has a flat web which is perpendicular to the first flange thereof, the second surface being on the web.

7. An assembly as claimed in claim 6, wherein each said support member has a second flange disposed parallel to the first flange, and extending along an opposite edge of said web, and extending in an opposite direction from said first flange.

8. An assembly as claimed in claim 7, wherein:

(a) each of the frame members has a second flat surface disposed perpendicularly to the first surface, (b) each said support member has a third flat surface on the second flange opposing the second flat surface of the adjacent frame member, (c) the edge portions of the screen are tightly received between the second flat surfaces of the frame members and the third flat surfaces of the support members.

9. An assembly as claimed in claim 8, wherein:

(a) the support members are orthogonal Z-section members, and (b) the frame members are rectangular sectioned tubes, each frame member having a third flat surface which is generally flush with the pulp fiber collecting surface of the screen, the first flange and web of the support members being located inwardly of the respective frame member.

10. An assembly as claimed in claim 1, further comprising means for clamping the edge portions of the screen between the frame and the support members.

11. An assembly as claimed in claim 10, wherein the means for clamping is a plurality of fasteners interconnecting the frame members and said adjacent support members.

12. An assembly as claimed in claim 1, further comprising:

(a) a latch means mounted adjacent one said frame member, the latch means including: a base member secured to the frame member; a latch arm hinged to the base member for rotation about a latch axis relative to the base member, the latch arm having inner and outer ends; and resilient means cooperating with the base member and the latch arm to permit limited lateral movement of the latch arm with respect to the base member out of a plane normal to the latch axis.

13. A combination as claimed in claim 12, in which the latch means is characterized by:

(a) a hinge pin extending from the base member and being concentric with the latch axis to permit the said rotation, the pin having an end stop, (b) the latch arm being rotationally mounted on the pin between the base member and the end stop, (c) the resilient means being a coil spring mounted on the hinge pin and between the end stop and the latch member to permit the limited lateral movement of the latch arm, (d) lead-in means on the outer end of the latch arm for facilitating engagement of the outer end with adjacent structure.

14. A method of mounting a screen within a rectangular frame so that an inner portion of the screen is drawn taut, the method comprising the steps of:

(a) placing the screen adjacent the frame so that edge portions of the screen which surround the inner portion overlie the frame;

(b) placing a support member inwardly of the frame to overlie the respective edge portion of the screen adjacent each side of the frame;

(c) moving at least one support member relative to an opposing support member to increase the spacing therebetween so that the inner portion of the screen is drawn taut;

(d) clamping the edge portions of the screen between the support members and the frame; and, (e) connecting the support members to the frame.

15. A method as claimed in claim 14:

(a) providing the frame and the support members with respective surfaces extending perpendicularly away from the inner portion of the screen, (b) the said clamping of the edge portions of the screen is between the said respective surfaces.

16. A method as claimed in claim 14, further characterized by:

(a) placing the screen into the frame, (b) forming a dish-shaped depression in the screen, (c) placing the support members over the screen, (d) positioning the support members relative to the frame such that the support members and frame members do not project beyond a pulp fiber collecting surface of the inner portion when the screen is drawn taut.

17. A method as claimed in claim 16, further characterized by:

(a) providing the frame with square section tubing, and the support members with an orthogonal Z-section, (b) placing one flange of each of the support members against the inner portion of the screen on a side opposite the pulp fiber collecting surface, (c) placing the screen between the web and the other flange of each of the Z-section members and two adjacent sides of said square tubing.

18. In combination:

(a) a pulp dryer having a dryer mounting frame and steam heating coils disposed adjacent the frame for heating air; and (b) a screen assembly mounted adjacent the heating coil for collecting pulp fibers, the said screen assembly having: a rectangular frame having four interconnected elongated frame members; four support members, each said support member being adjacent a respective frame member and aligned therewith; a rectangular screen having a taut inner portion and surrounding edge portions, the support members contacting the screen to define a boundary between said taut inner portion and said edge portions, said edge portions adjoining said inner portion being clamped between and protected from abrasion by the frame members and said respective support members, said inner portion of the screen having a pulp fiber collecting surface on an upstream side of the screen and extending along a plane, said support members and frame members being located such that said support members and frame members do not project beyond said pulp fiber collecting surface of said inner portion, so that no pronounced portions of the frame and support members overlie edge portions of said pulp fiber collecting surface to facilitate cleaning of the upstream side of the screen.

19. A combination as claimed in claim 18, wherein:

(a) the frame members are straight lengths of rectangular section tubing, and (b) the support members are straight lengths of orthogonal Z-section members, each support member having a first flange extending inwardly from the respective frame member and in contact with the screen on a downstream side thereof opposite to the pulp fibre collecting surface.

20. A combination as claimed in claim 18, wherein:

a) the steam coil mounting frame has a pair of outer surfaces spaced apart at a transverse spacing defining width of a coil heating surface opening, b) the frame members are straight lengths of rectangular section tubes, c) the support members include two oppositely disposed straight orthogonal W-section members; each W-section support member having a first flange extending inwardly from the respective frame member and in contact with the screen on a downstream side thereof opposite to the pulp fiber collecting surface; each W-section support member also having an outer web disposed perpendicularly to the first flange and extending in a downstream direction away from an opposite side of said plane, each outer web having a guide portion extending therefrom, the guide portion of each of said W-section members being spaced apart at a spacing somewhat greater than a transverse spacing between the said pair of outer surfaces defining the coil heating surface opening.

21. A combination as claimed in claim 20, further including:

(a) a pair of support pins located adjacent a first end of the rectangular frame and adjacent a respective guide portion, the pins extending from the rectangular frame in a downstream direction away from the screen to outer ends of the pins, (b) the guide portion extending from each outer web of the support member has an outer edge projecting beyond the outer end of the adjacent support pin.

22. A combination as claimed in 18, further including:

(a) a resilient member extending from a second end of the rectangular frame which is remote from the first end.

23. A combination as claimed in 21, in which:

(a) the support pins are inclined obliquely to the pulp fiber collecting surface and are inclined away from the first edge towards the second edge of the frame, (b) each guide portion is located outwardly of the respective adjacent support pin.

24. A screen assembly comprising:

(a) a rectangular screen having edge portions and an inner portion having a pulp fiber collecting surface extending along a plane on an upstream side of said plane with respect to direction of air flow through the screen;

(b) a rectangular frame having four interconnected elongated frame members, each said frame member having a first surface extending perpendicularly to said plane;

(c) four support members within the frame, each said support member being adjacent a respective frame member and aligned therewith, each said support member having a second surface which opposes said first surface of the adjacent frame member, the edge portions of said screen being located between the first and second surfaces; and (d) means for biasing at least two oppositely disposed support members away from each other towards the respective frame member aligned therewith, said means including a resilient cross-member biased between said oppositely disposed support members, said cross-member being spaced apart from the screen on said opposite downstream side of said plane.

25. An assembly as claimed in claim 24 wherein each of the support members is an orthogonal W-section member having a first flange with a first surface adjacent the inner portion of the screen on the downstream side of the screen, a perpendicular web with the second surface opposing the first surface of the adjacent frame member, and means for mounting the assembly on a heating coil mounting frame, said means including an outer web and a support pin associated with each support member.

26. An assembly as claimed in claim 24, the means for biasing further including diagonal cross-members biased between each of said opposite support members and adjacent thereto.

27. An assembly as claimed in claim 24 wherein the cross-member is a bow-shaped leaf spring spaced-apart from the screen.

28. An assembly as claimed in claim 27 where the cross-member is straight when unstressed.

29. An assembly as claimed in claim 24 in which:

(a) each cross-member has opposite end portions, (b) end pieces are secured to the respective end portions;

(c) the end pieces are secured to the oppositely facing support members.

30. An assembly as claimed in claim 25, wherein:

(a) each support pin extends from the rectangular frame in a downstream direction away from the screen to outer ends of the pins, (b) a guide portion extends from each outer web and has an outer edge projecting beyond the outer end of the adjacent support pin.

* * * * *